April 25, 1961    G. E. EDLUND    2,981,004
DRAFTSMAN'S PERSPECTIVE INSTRUMENT
Filed March 16, 1959    2 Sheets-Sheet 1
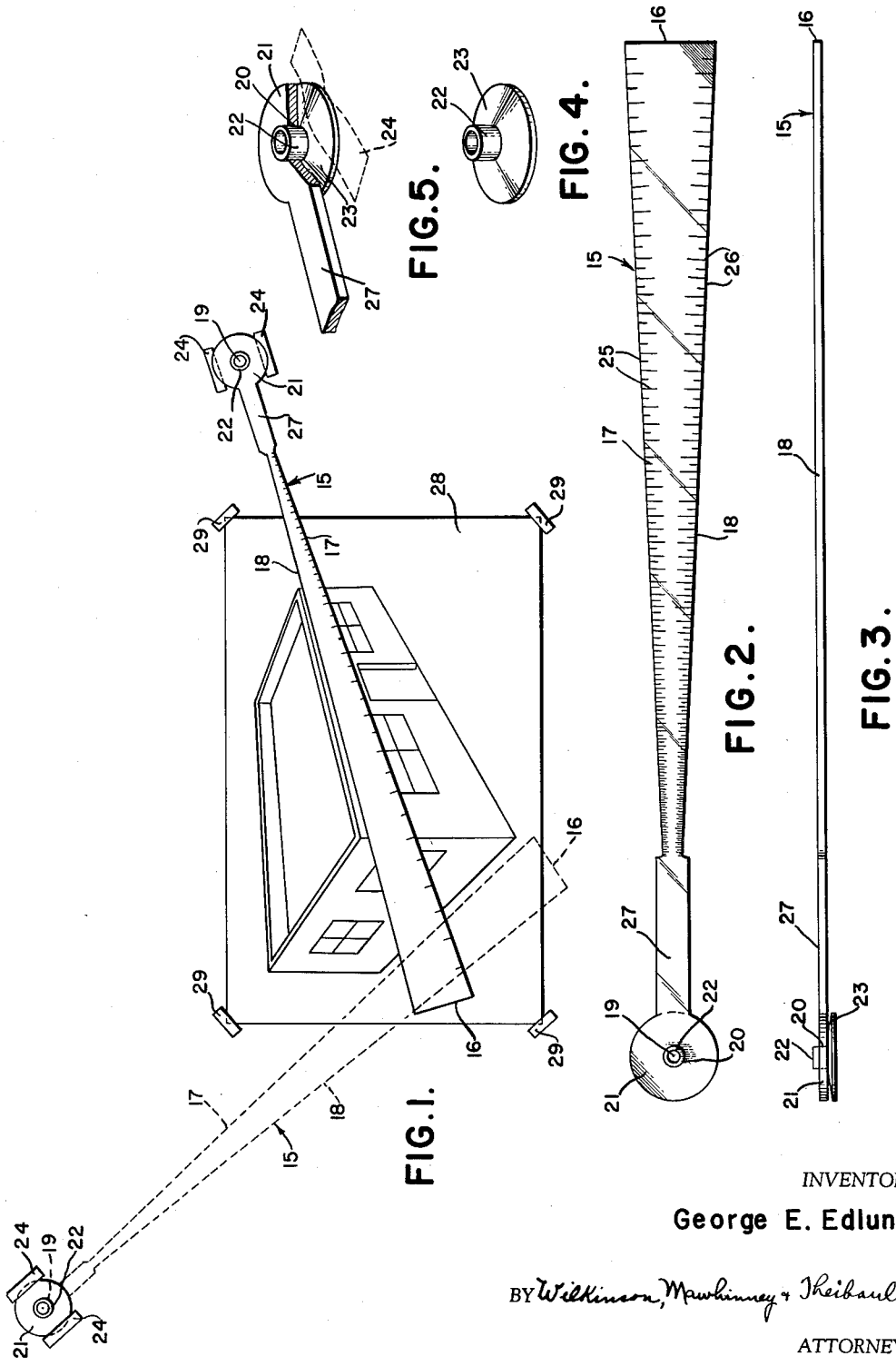
INVENTOR
George E. Edlund
BY Wilkinson, Mawhinney & Theibault
ATTORNEYS April 25, 1961  G. E. EDLUND  2,981,004
DRAFTSMAN'S PERSPECTIVE INSTRUMENT
Filed March 16, 1959  2 Sheets-Sheet 2
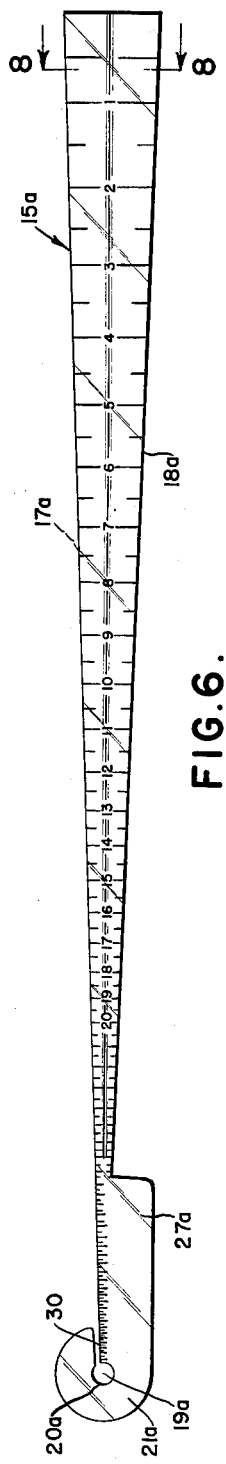
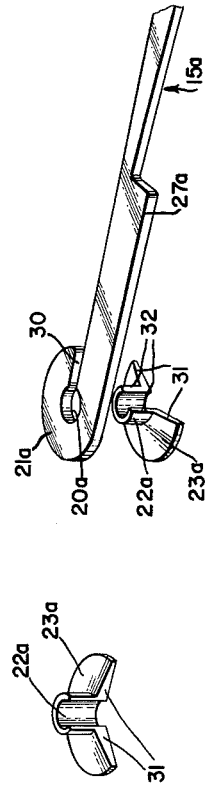
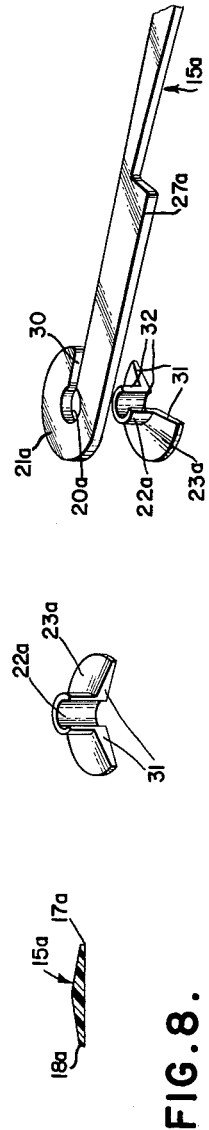
INVENTOR
George E. Edlund

United States Patent Office 2,981,004
Patented Apr. 25, 1961

2,981,004

DRAFTSMAN'S PERSPECTIVE INSTRUMENT

George E. Edlund, 727½ Main St., Deadwood, S. Dak.

Filed Mar. 16, 1959, Ser. No. 799,656

1 Claim. (Cl. 33—77)

The present invention relates to draftsman's perspective instrument and has for an object to provide an instrument for the use of draftsmen in making that type of drawing giving the effect of depth and distance, or in other words three-dimensional.

Another object of the invention is to produce an instrument which is a valuable aid in visualizing a difficult or intricate form on paper.

A further object of the invention resides in providing an instrument of simple design making it a versatile, accurate and inexpensive instrument useful by artists, art students, designers, inventors, as well as architects and draftsmen.

With the foregoing and other objects in view, the invention will be more fully described hereinafter, and will be more particularly pointed out in the claim appended hereto.

In the drawings, wherein like symbols refer to like or corresponding parts throughout the several views:

Figure 1 is a plan view of two instruments constructed in accordance with the present invention, one in full lines and one in dotted lines extending over an object drawing;

Figure 2 is a plan view of the instrument;

Figure 3 is a longitudinal edge view of the same;

Figure 4 is an isometric view of a form of pivot piece employed;

Figure 5 is a fragmentary isometric view with parts shown in section illustrating the bearing member to the pivot piece;

Figure 6 is a plan view of a slightly modified form of the invention;

Figure 7 is a longitudinal edge view of the same;

Figure 8 is a cross sectional view taken on the line 8—8 in Figure 6;

Figure 9 is an isometric view of a modified form of pivot piece, and

Figure 10 is also an isometric view of the pivot piece taken from a different angle with the bearing member of the instrument poised above the same indicating a method of assembly.

Referring more particularly to the drawings, and for the present to Figures 1 to 5 inclusive, 15 designates a straight-edge member or blade having an enlarged free end 16 and straight longitudinal edges 17 and 18 converging to a vanishing point 19, which is the center of an aperture 20 in a bearing member or disc 21 at the other end of the instrument.

The bearing member 21 is fitted for angular adjustment over a pivot trunnion 22 upstanding from a wide flat base plate 23 affixed by tapes 24, which are adhesive, precisely on the vanishing point. The trunnion 22 and its base plate 23 constitute a pivot piece.

The blade 15 bears scales 25 and 26 along its longitudinal edges 17 and 18 and a thickened or wide neck 27 connects the narrow end of the blade 15 with the bearing disc 21. The neck 27 forms a reinforcement between the narrowest section of the blade and the bearing member or disc.

In Figure 1 the object drawing is shown on drawing paper 28 affixed by tapes 29 at the corner portions to a suitable drawing board or drafting table or the like.

Referring more particularly to Figures 6 to 10 inclusive, 15$^a$ designates the blade, 17$^a$ and 18$^a$ the longitudinal convergent straight edges, and 19$^a$ the vanishing point. This vanishing point forms the center of a circular aperture 20$^a$ in the bearing disc 21$^a$ adapted to be fitted about the pivot trunnion 22$^a$ of the base plate 23$^a$ of the pivot piece. A thickened shank or neck 27$^a$ reinforces the laterally narrowest portion of the blade and connects with the disc 21$^a$.

A slot 30 is made through this disc or bearing member 21$^a$ from the central aperture 20$^a$ outwardly all the way through the outer edge of the disc, this slot 30 extending in alignment with the straight edge 17$^a$ whereby this straight edge forms one side of the slot 30.

As seen best in Figures 9 and 10, the pivot piece is cut away or provided with open sides 31 and 32. The open side 31 of the pivot trunnion 22 is adapted to register with the inner end of the slot 30, and the open side 32 of the base plate 23$^a$ will lie immediately below the slot 30. The pivot trunnion 22$^a$ is hollow so as to permit uninterrupted access to the vanishing point which is its center.

In the use of the instrument, first referring to Figures 1 to 5 inclusive, the pivot piece is first located precisely on the vanishing point and taped in place by means of the adhesive tapes 24. This piece may be made from almost any material including plastics, which has been found to be a practical material.

Having once located and affixed the pivot piece to the drawing board, the bearing disc 21 is fitted over the trunnion 22 in the manner shown in Figure 5 and the blade is thereupon freely rotatable about this trunnion for any desirable angular adjustment with respect to the drawing paper 28.

The dotted instrument shown in Figure 1 shows another position that the instrument may occupy in accomplishing perspective lines in angular relation to the perspective lines produced in the position of the full line instrument.

In Figure 1 is shown a typical perspective drawing being made with the aid of the instrument of this invention. It will be noted that the draftsman is not restricted to any one area of the drawing board in which to place the vanishing points. In fact the vanishing point could be placed on the paper 28 itself if necessary.

It will also be noted that the convergent edges 17, 18, or 17$^a$, 18$^a$ in the case of the modified form, directly bisect the pivot or vanishing point giving to the drawing undistorted accuracy.

The scales 25, 26 are diminishing scales to proportion parts as they approach the vanishing point.

It will be understood that the device may be made in any dimensions and from any suitable material, for instance, plastic, wood, aluminum, stainless steel and the like. A satisfactory form has been made from Plexi-Glass approximately ⅛ inch thick.

Among some of the advantages of the invention are:

(1) *Versatility:* The freedom of location of the vanishing points makes for convenience in drawing radiating lines from a central point, as in gears, spokes or motor winding diagrams.

(2) *Simplicity:* No elaborate methods are involved in either setting up or operation.

(3) *Inexpensiveness:* The instrument can be mass produced and sold for little more than a conventional plastic ruler or for a fraction of the cost of instruments now available having inferior characteristics.

In the use of the instrument of Figures 6 to 10 inclusive, the assembly is as heretofore described and is plainly indicated in Figure 10, the aperture 20ª accommodating the trunnion 22ª. The slot 30 enables the user to work closer to the vanishing point. The part 27ª reinforces the narrow portion of the blade which, while limiting the use of the bottom edge 18ª to a point removed a few inches from the vanishing point, permits the upper edge 17ª to approach very closely to that vanishing point. It will be understood that the user is able to mark with either edge 17ª or 18ª as both converge through center line of pivot point.

Figure 6 illustrates one scale possibility. A greater or lesser degree of diminishing effect can be gained easily (starting at the right end). Each length between divisions of the scale is decreased by a fraction of the one on its right. Working toward the left I get, for instance, 1"; then .875"; next .875"×⅞", etc. to infinity or the vanishing point.

Figure 8 shows one potential cross section, although the blade or ruler may be made of any suitable cross section which facilitates a good marking edge.

The open sides 31 and 32 of the pivot piece allow the user to work closer to the vanishing point, and the hollow center 22ª permits visual alignment of pivot on vanishing point.

The modifications shown in Figures 6 to 10 inclusive are as follows: the slot 30 in connection with the aperture 20ª, the longer, narrower shape of the blade and edges, and the open-sided circular shape of the pivot piece.

The construction of the base 23, 23ª of the pivot piece as a wide flat base enables the taping of the pivots directly on the working surface, thereby giving an altogether more versatile and simple application. The pivot piece can be used on any suitable drawing surface, for instance, any available drawing board, a large sketch pad, blackboard, kitchen table, or even the floor, etc.

The tapered shape of the blade involving both sides converging through the vanishing point allows the use of either side for marking without departing from undistorted perspective.

The invention employs only one moving part and due to its lightweight design its storage and transportation problems are diminished considerably over conventional devices.

Although I have disclosed herein the best forms of the invention known to me at this time, I reserve the right to all such modifications and changes as may come within the scope of the following claim.

What is claimed is:

A draftsman's perspective instrument comprising a substantially thin flat blade having longitudinal edges converging toward one another and a vanishing point at one end of the blade but terminating short of said vanishing point, scales inscribed along such edges, a substantially thin flat neck integral with the narrow end of the blade and of substantially the same thickness thereof but wider than the narrow end of the blade, a substantially thin flat disc integral with and extending from said neck and having an aperture substantially centrally therethrough coinciding at its center with such vanishing point, a disc-like base plate adapted to rest on a drawing surface, gummed tapes extending across the base plate and affixed to the drawing surface, and an upstanding trunnion substantially secured centrally to the base plate for receiving the aperture of the disc with the disc resting on the base plate and rotatable thereon, one of said converging edges of the blade extending uninterruptedly to the aperture in the disc along an unwavering convergent line, said disc having a slot extending to the apereure, one side of the slot being formed by a portion of the extended convergent edge, said neck extending wholly to the side opposite the extended convergent edge, said base plate and its trunnion cut away segmentally and adapted to register with the said slot.

References Cited in the file of this patent

UNITED STATES PATENTS

| | | |
|---|---|---|
| 618,135 | Saunders et al. | Jan. 24, 1899 |
| 934,260 | Allison | Sept. 14, 1909 |
| 1,241,282 | Remer et al. | Sept. 25, 1917 |
| 1,348,655 | Moore | Aug. 3, 1920 |
| 2,651,111 | Stiebing | Sept. 8, 1953 |
| 2,734,274 | Sams | Feb. 14, 1956 |

FOREIGN PATENTS

| | | |
|---|---|---|
| 591,691 | Great Britain | Aug. 26, 1947 |
| 299,393 | Switzerland | Aug. 16, 1954 |